(12) United States Patent
Brawn

(10) Patent No.: US 11,369,097 B2
(45) Date of Patent: Jun. 28, 2022

(54) BAIT CONTAINER

(71) Applicant: Patricia Brawn, Cape Elizabeth, ME (US)

(72) Inventor: Peter Brawn, Cape Elizabeth, ME (US)

( * ) Notice: Subject to any disclaimer, the term of this patent is extended or adjusted under 35 U.S.C. 154(b) by 389 days.

(21) Appl. No.: 16/724,510

(22) Filed: Dec. 23, 2019

(65) Prior Publication Data

US 2020/0214275 A1 Jul. 9, 2020

Related U.S. Application Data

(60) Provisional application No. 62/788,166, filed on Jan. 4, 2019.

(51) Int. Cl.
*A01K 69/08* (2006.01)
*A01M 23/16* (2006.01)

(52) U.S. Cl.
CPC ............ *A01K 69/08* (2013.01); *A01M 23/16* (2013.01)

(58) Field of Classification Search
CPC ....... A01K 69/08; A01K 69/06; A01M 23/16; A01M 23/18
See application file for complete search history.

(56) References Cited

U.S. PATENT DOCUMENTS

| | | | | |
|---|---|---|---|---|
| 1,887,059 A * | 11/1932 | Kraus | ................... | A01K 69/08 43/69 |
| 2,160,809 A * | 6/1939 | Burnley | ................ | A01M 23/18 43/67 |
| 2,316,888 A * | 4/1943 | Schreyer | ................ | A01K 69/06 43/66 |
| 2,731,761 A * | 1/1956 | Marshall | ................ | A01K 69/08 220/DIG. 25 |
| 4,080,749 A * | 3/1978 | Gilbaugh | .............. | A01M 23/16 43/61 |
| 4,416,082 A * | 11/1983 | Strobel | .................. | A01K 69/06 43/105 |
| 4,424,641 A * | 1/1984 | Kyte | ...................... | A01K 69/08 220/811 |
| 4,765,089 A * | 8/1988 | Rowe | .................... | A01K 69/06 43/105 |
| 6,327,809 B1 * | 12/2001 | Comes | .................. | A01M 23/16 43/87 |
| 2019/0191679 A1* | 6/2019 | Scaglione | .............. | A01K 69/08 |

* cited by examiner

*Primary Examiner* — Christopher R Harmon

(57) ABSTRACT

A bait container that is attached to inside of a trap, the bait container having a sidewall that forms an enclosure along with a cover that may open and close, a first connector that connects the cover to a door on the trap and a second connector that has some elasticity and that connects the cover to a lower or bottom portion of the container or the trap, the second connector securing the cover in a closed position when the trap door is closed and the first connector opening the cover when the trap is open such that the cover to the bait container is opened or closed as a user opens and closes the door to the trap.

9 Claims, 7 Drawing Sheets

BAIT CONTAINER

BACKGROUND INFORMATION

Field of the Invention

The invention relates to containers for holding bait, particularly those used with commercial fishing traps.

Discussion of Prior Art

Bait has long been used to catch a wide variety of fish and crustaceans. Crustaceans, in particular, are known to be drawn to a variety of fish. Typically, crustaceans are caught in wire traps that sit on the ocean floor for a period of time. Bait is placed in these traps to lure in the crustaceans and is secured within the trap using a variety of means such as being placed in bags that hang from a portion the trap or being tied to or inserted over strings or ropes within the traps. In the case of a bait bag, the bait is typically inserted into a mesh bag, often made from a durable nylon, and the bag is then tied into the trap. Each time the trap is hauled the bag is removed and either refilled and reinserted or a different bag filled with new bait is inserted. The process of tying and untying the bags becomes quite time consuming as hundreds of traps are typically hauled each day.

As crustaceans are drawn to the bait they use their claws to pull the bait out of the bags. In doing so, they deplete the bait supply, diminishing the ability of the trap to attract new crustaceans. Also, their attempts to reach the bait may tear the bags, which ultimately leads to more bait loss and subsequently fewer crustaceans being caught in the traps. It also requires regular replacement of the bags themselves.

What is needed, therefore, is a bait container that is resistant to the crustaceans' claws, thereby preserving both the bait and the bag. What is further needed is a bait container that is conveniently filled and refilled in a manner that is not time consuming.

BRIEF SUMMARY OF THE INVENTION

The invention is a bait container that is affixed inside of a trap. The trap and container may be used to catch a wide variety of living creatures such as cephalopods, fish, as well as crustaceans such as lobsters, crabs and shrimp. The bait container has a closed sidewall that forms an enclosure with a plurality of openings and an openable top, and is made of a rigid material.

For example, the openable top may be a lid that is hingedly attached to one side of the top of the container. The openable top is connected to two connectors, one of which is secured to a door on the trap and the other of which is secured to a lower portion of the trap or the container. For example, an elastic connector having two ends may be affixed on one end to the openable top and on the other end to the bottom of the trap, the elasticity of the connector securing the lid in a closed position. The second connector may be a cord that is affixed to the top of the lid and is attachable to the door on the trap, such that when the door to the trap is opened the lid to the bait container is opened as well as the elastic connector stretches.

In use, as the fisherman opens the door to the trap the lid of the container is pulled open by the connector at which point the container is open and ready to receive bait, either directly into the container or, if the fisherman chooses, a traditional bait bag may be placed inside the container. Once the fishermen finishes emptying the trap and adding bait the door to the trap is closed in the normal course of the activity and, as a result, the lid on the container is pulled securely shut by the elastic connector. The plurality of openings in the sidewall allows the crustaceans' access to the bait, while the rigid material is resistant to crustacean claws. As a result, the container is not easily punctured and the bait is not easily eaten or lost. The bait stays in the trap longer, thus allowing the trap to catch crustaceans longer. The container is not removed like a traditional bait bag, but rather is stays in place and is simply refilled. When the trap door is opened the cord opens the container door, presenting the fishermen with an open bait container ready to be filled with new bait, saving considerable time throughout the course of a day.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
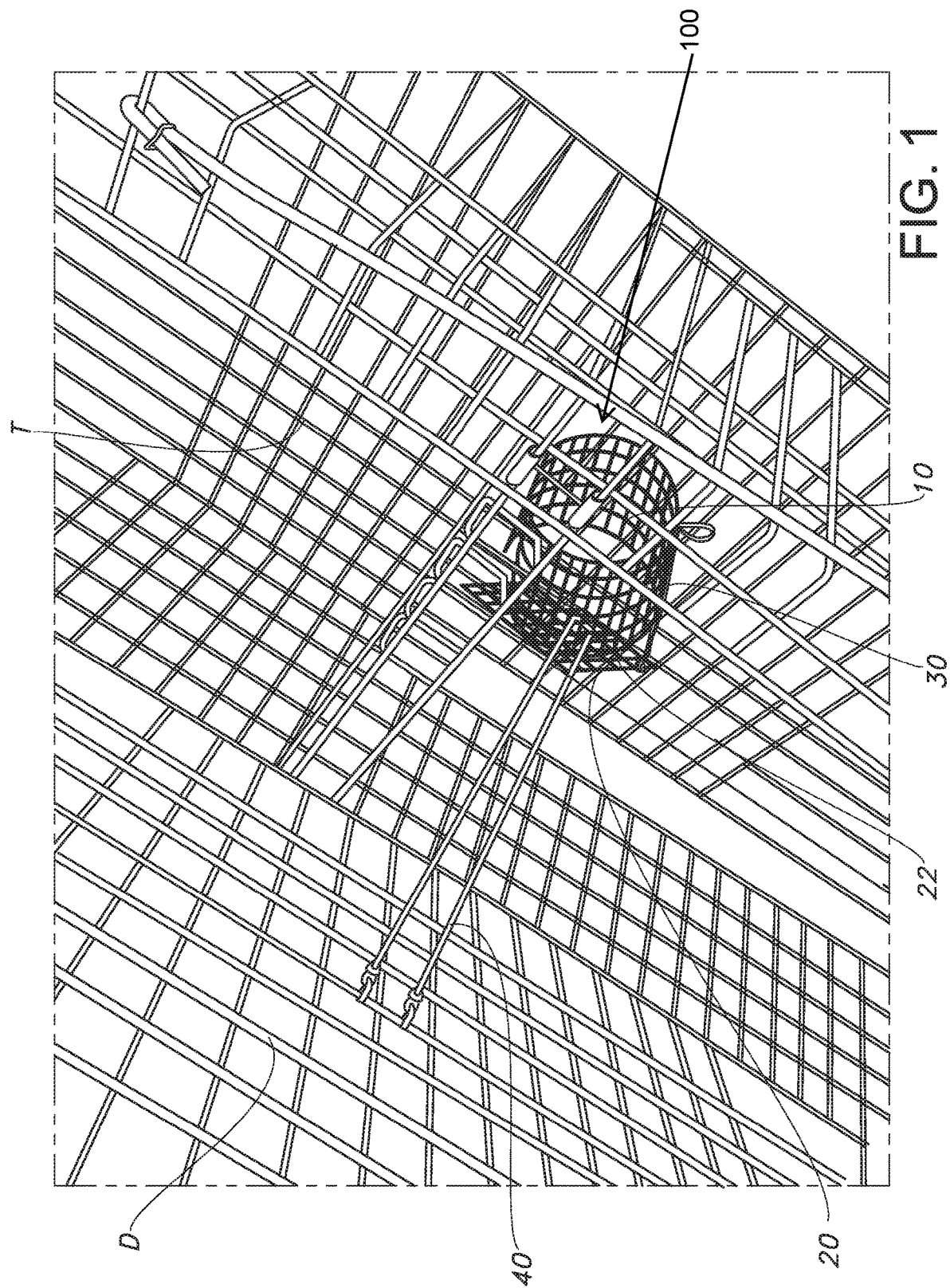
FIG. 1 is a top perspective view of the device inside of a trap with the trap door open.
Figure 2:
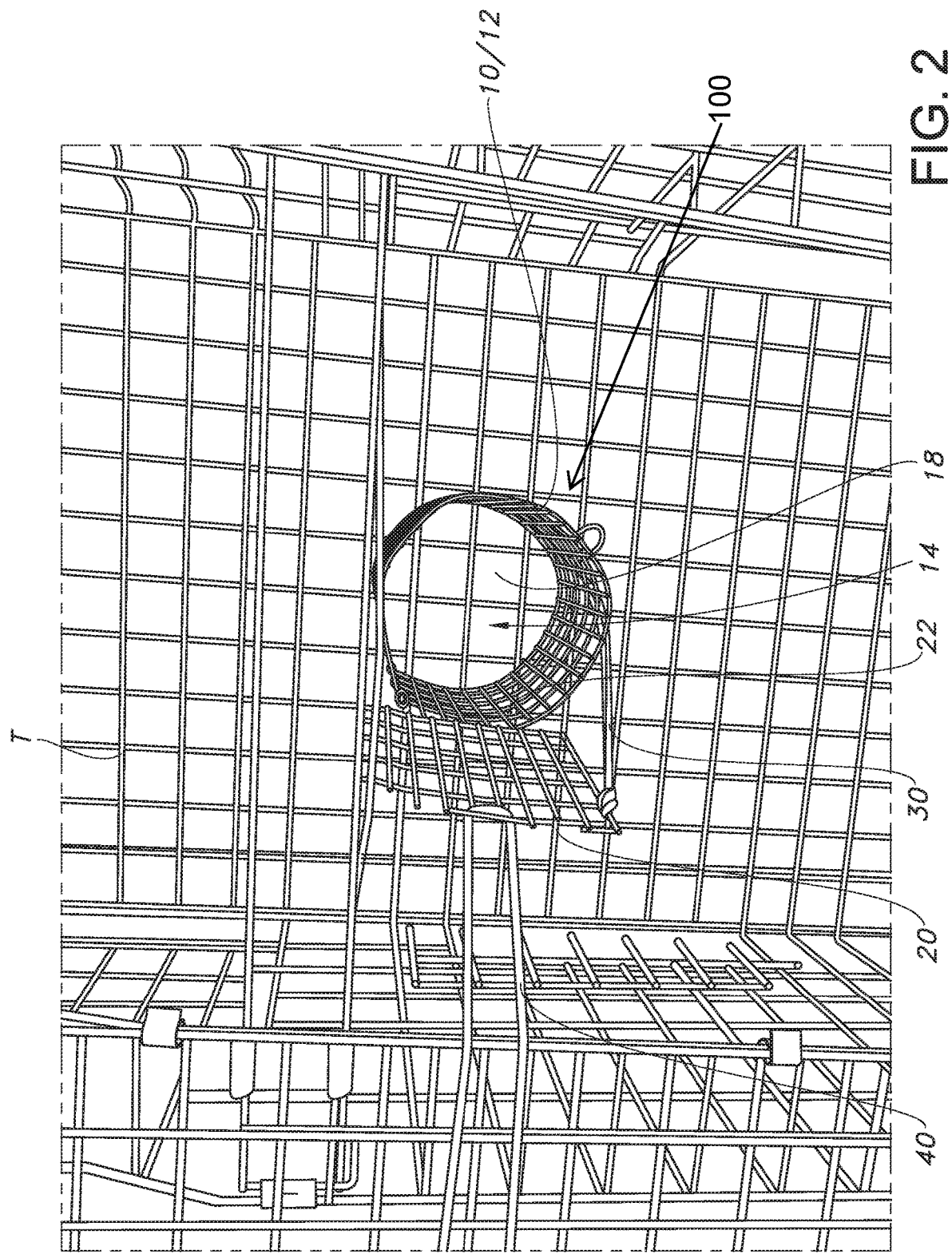
FIG. 2 is a top perspective view of the device in the trap.
Figure 3:
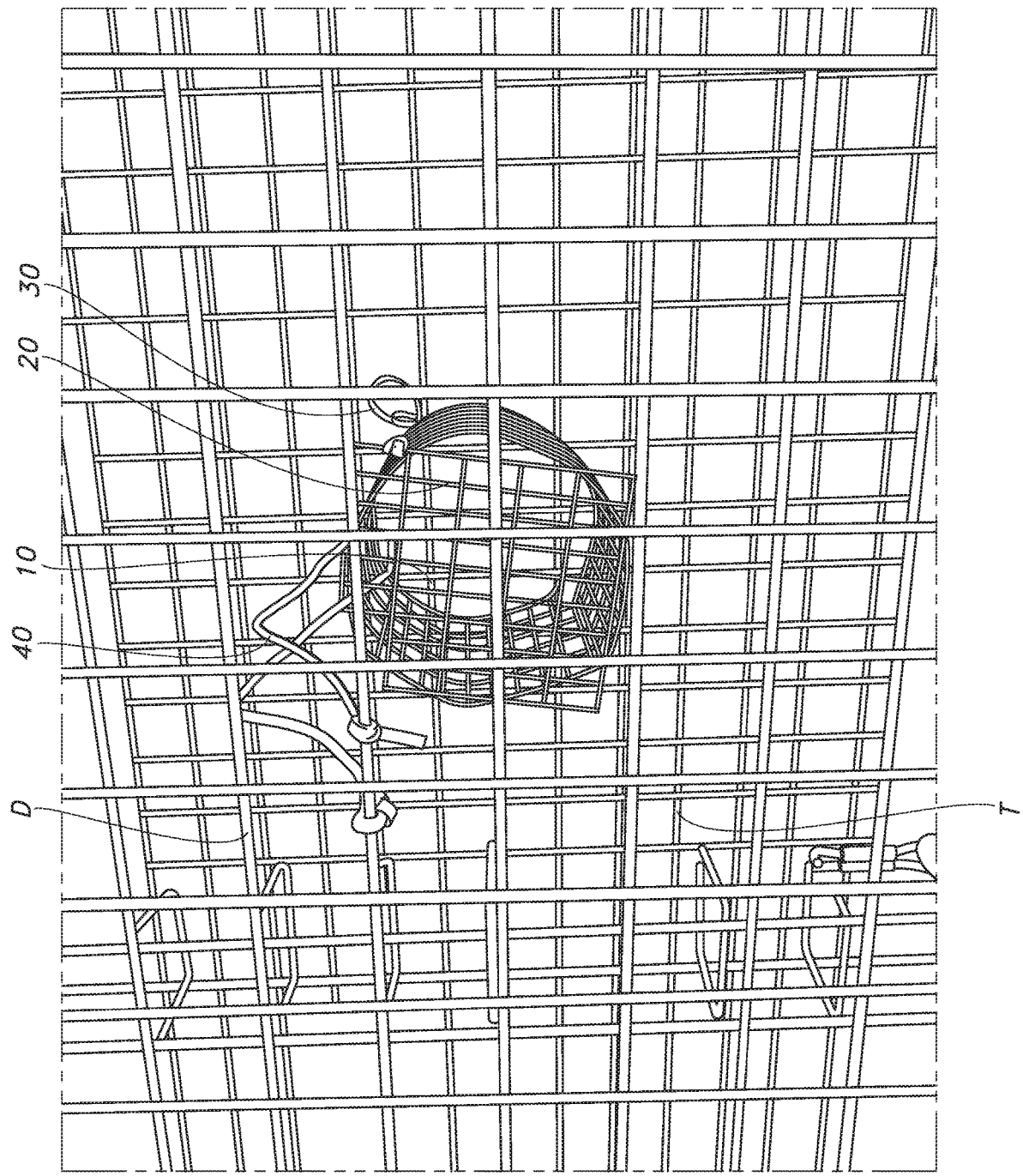
FIG. 3 is a top perspective view of the device inside a trap with the trap door closed.
Figure 4:
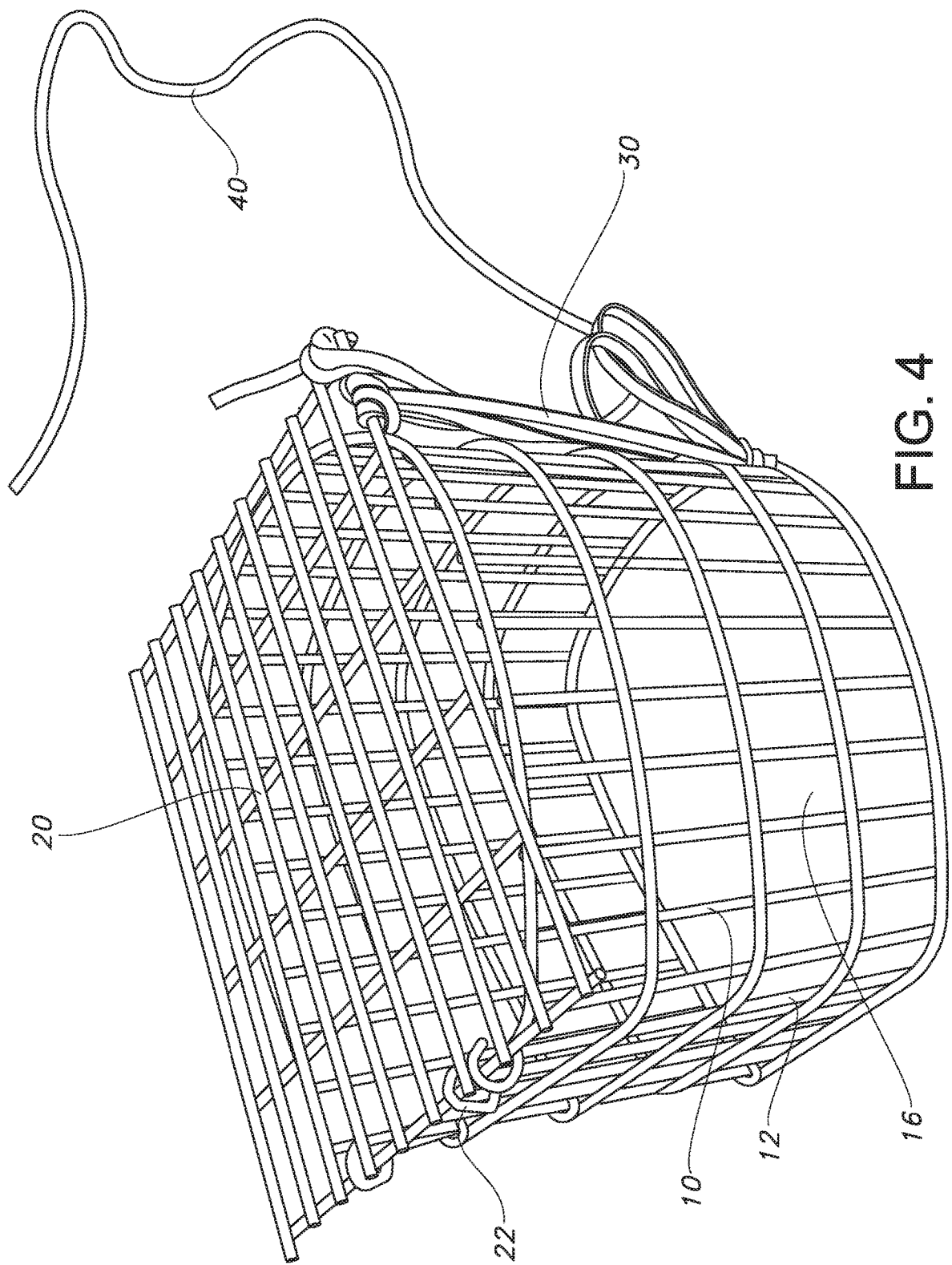
FIG. 4 is a top perspective view of the device with the lid closed.
Figure 5:
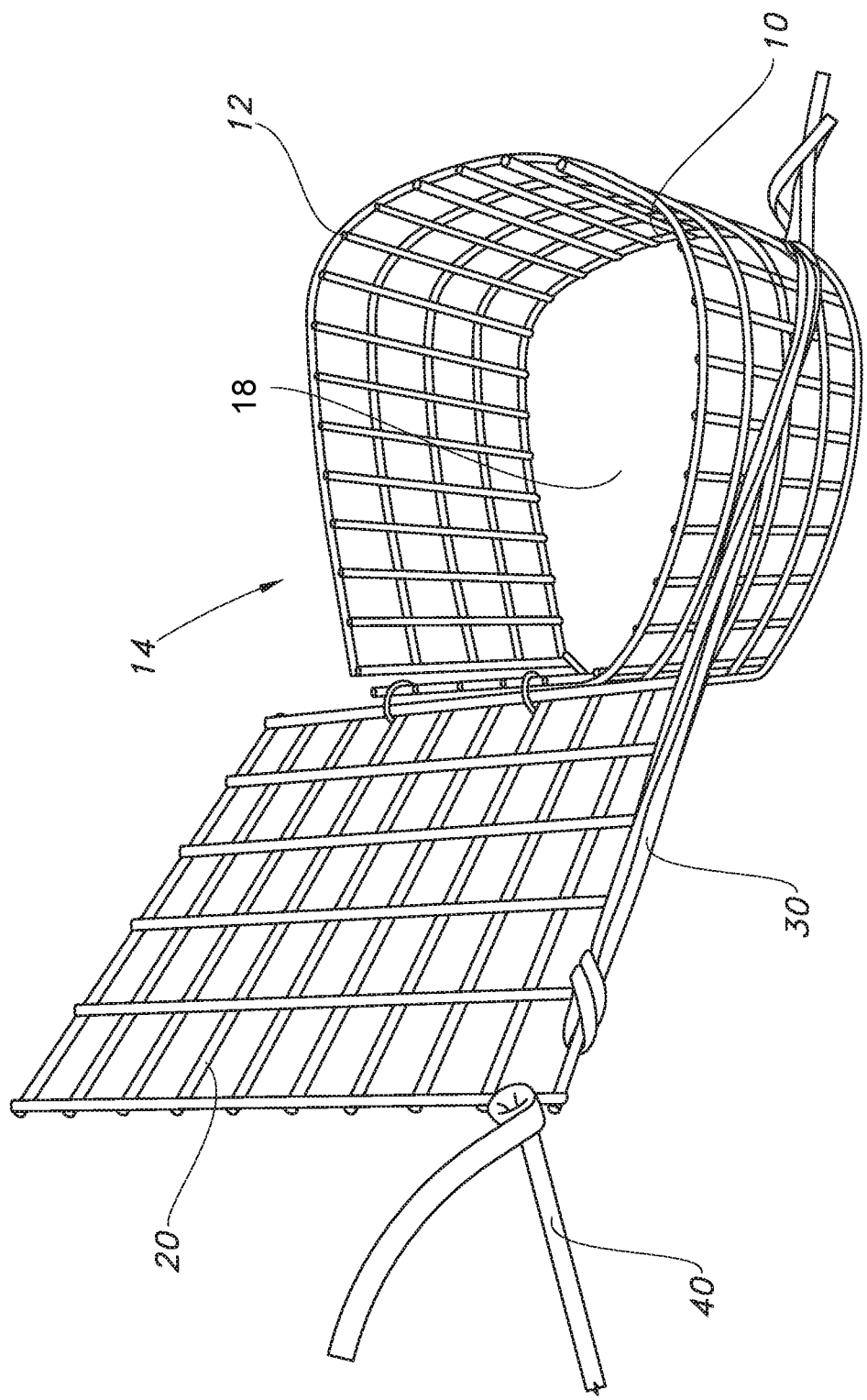
FIG. 5 is a top perspective view of the device with the lid open.

FIGS. 1-7 illustrate the bait container 100 according to the invention for securing bait inside of a trap T that has an openable door D. The container 100 includes a sidewall 10 that creates an enclosure around an inner space of the bait container 100, an openable top or lid 20, a lid securing means 30, and a lid opening means 40. The lid securing means 30 has at least some elasticity and is attached on one end to the lid 20 and on a second end to a lower or bottom portion of the sidewall 10 or a lower portion of the trap T, the elasticity causing the lid 20 to stay closed atop the enclosure 10 when the trap T is closed. The lid opening means 40 connects the lid 20 to the door D such that when a user opens the trap door D the lid 20 is opened and when the user subsequently closes the trap door D the lid securing means 30 pulls the lid 20 closed. In this manner, in order to open or close the bait container 100 the user need only open or close the door D of the trap T. FIGS. 1 and 2 illustrate the open door D and lid 20 and FIG. 3 illustrates the closed lid 20 and door D.

Figure 6:
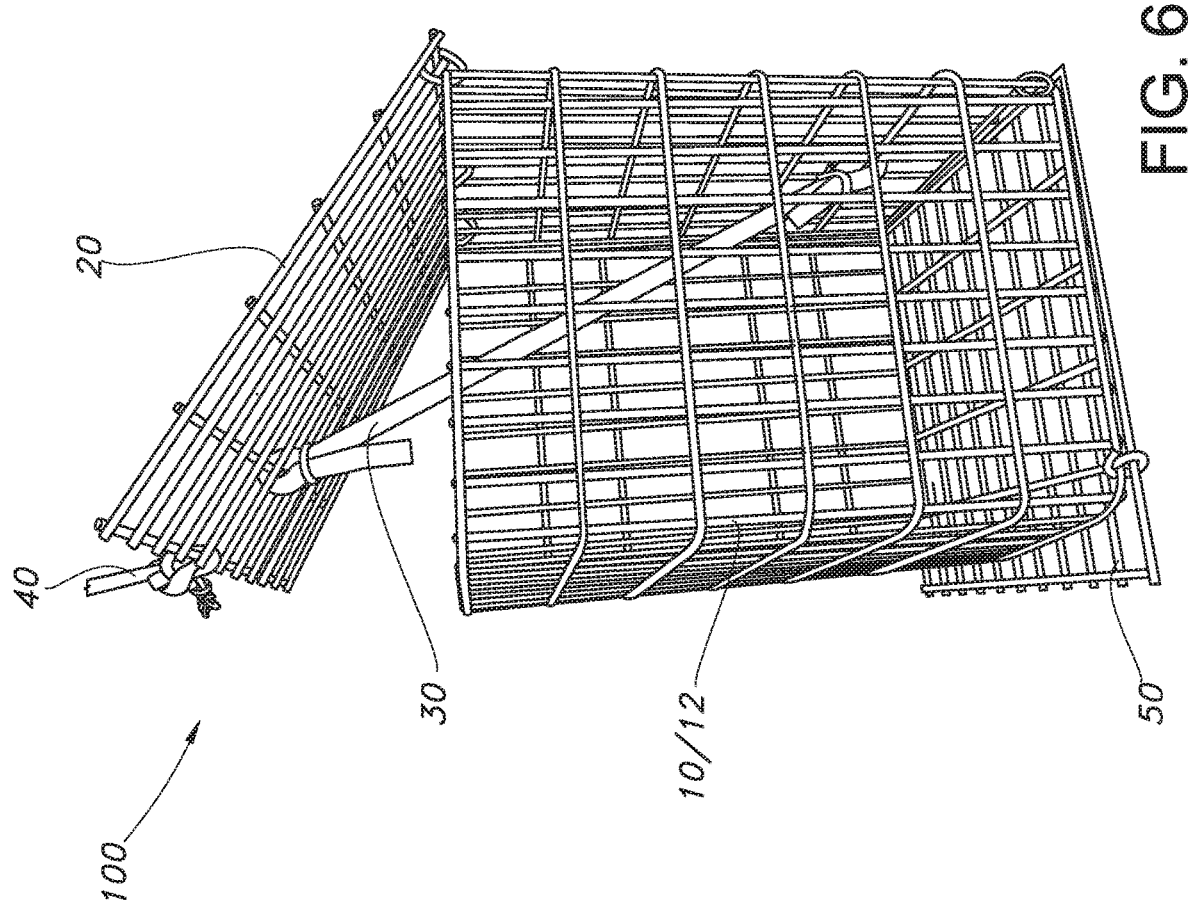
FIG. 6 is a side perspective view of a second embodiment of the device being a roughly square shape and having a connector inside the container.
Figure 7:
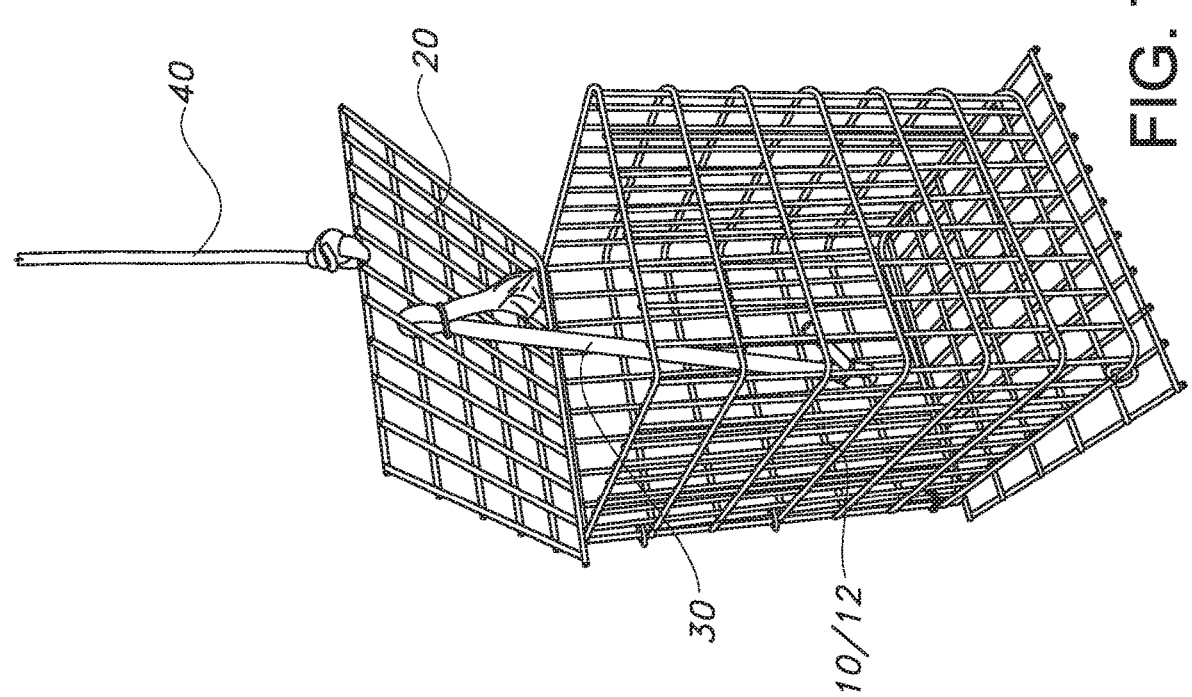
FIG. 7 is perspective view of the device showing the top and front of the device.

More specifically, the sidewall 10 includes one or more wall sections 12 and has an open top 14. The sidewall 10 is constructed of a rigid material, such as, for example, 16 gauge wire coated in polyvinyl chloride ("PVC") that is frequently used to make traps. Other materials that are sufficiently rigid to maintain the shape of wall 12 are also acceptable. In the embodiment shown in FIGS. 1-5 the sidewall 10 is constructed from a single piece of wire that is bent into a rounded shape with the two ends of the piece of wire connected to one another to complete the enclosure. However, the wire may also be formed in other shapes such as square or rectangular as shown in FIGS. 6 & 7, so long as the interior of the container 100 has sufficient space to hold the bait. Multiple wall sections 12 may also be combined to create a similarly shaped enclosure. The sidewall 10 has mesh openings 16 that are small enough to hold in the bait while being large enough to allow the crustaceans to sense its presence. For example, rectangular openings that measure ½ inch wide and 1 inch long are suitable.

In the embodiment shown in FIGS. 1-5, the container 100 has an open bottom 18 and is affixed to the bottom of the trap T using traditional trap accessories such as hog rings. This manner of affixing the container 100 to the trap is particularly advantageous as it reduces the amount of material necessary to construct the container, makes use of a suitable bottom that is already in place, and makes use of tools, i.e. hog rings and pliers, which nearly all fishermen and trap makers have in their possession. In other embodiments, such as that shown in FIGS. 6 & 7, the container may also have a closed bottom, using, for example, a material similar to that used for the sidewall or trap T. The bait container 100 may also be placed on a form of shelf or atop some number of legs to place the bait in an elevated position above the floor of the trap T.

The lid 20 is constructed of a material similar to the sidewall, again having mesh openings that are of suitable size for holding bait that is used to lure crustaceans. The lid 20 is hingedley attached to the top of the sidewall 10 using any suitable hinge means 22. For example, hog rings make a particularly effective hinge for this type of material.

The lid securing means 30 is an elastic cord or rubber band or similar material having sufficient elasticity to hold the lid 20 firmly shut on top of the sidewall 10 but also to allow a user to pull the lid 20 open. The lid securing means 30 has two ends, one end being fixed to the lid 20 on the side opposite the hinge 22 and the other end affixed at or near the bottom of the sidewall 10. FIGS. 1-5 illustrate the lid securing means 30 being attached to an outer portion of the container 100 while FIGS. 6 & 7 illustrate the securing means 30 being attached inside the container 100.

The lid opening means 40 is a string, rope, or cord having at least two ends. One end of the lid opening means 40 is affixed to the lid 10 on the side of the lid opposite the hinge, and the other end is affixed to the trap door D. Opening the door D exerts a force on the lid opening means 40 that is sufficient to open the lid 20, and once the door is full open the weight and positioning of the door is sufficient to keep the lid open 20 despite the force being exerted by the lid securing means 30.

It is understood that the embodiments described herein are merely illustrative of the present invention. Variations in the construction of the Bait Container may be contemplated by one skilled in the art without limiting the intended scope of the invention herein disclosed and as defined by the following claims.

What is claimed is:

1. A bait container device adapted to hold bait in a trap, the trap having a trap door, the bait container device comprising:
    a sidewall that is attached to a portion of the trap and that forms an enclosure with a top that is at least partially open;
    a cover connected to the top of the sidewall that is openable;
    a first connector having a first end and a second end, the first connector's first end being attached to the openable cover and the first connector's second end being attached to a lower portion of the sidewall or to a lower portion of the trap;
    a second connector having a first end and a second end, the second connector's first end being attached to the openable cover and the second connector's second end being attached to the trap door;
    wherein opening the trap door causes the second connector to open the openable cover; and
    wherein the first connector closes and secures the openable cover in a closed position when the trap door is closed.

2. The bait container of claim 1, wherein the sidewall has a plurality of openings.

3. The bait container of claim 1, wherein the openable top has a plurality of opening.

4. The bait container of claim 1, wherein the enclosure is made of a rigid material.

5. The bait container of claim 1, wherein the first connector is made of an elastic material.

6. The bait container of claim 1 further comprising a bottom cover that includes a plurality of openings.

7. The bait container of claim 1, wherein the first connector's second end is attached inside the enclosure.

8. The bait container of claim 1, wherein the first connector's second end is attached outside of the enclosure.

9. The bait container of claim 1, wherein the sidewall is comprised of wire coated in polyvinyl chloride.

* * * * *